(12) United States Patent
Yasuda

(10) Patent No.: US 6,570,178 B2
(45) Date of Patent: May 27, 2003

(54) METHOD OF AND APPARATUS FOR READING OUT RADIATION IMAGE DATA

(75) Inventor: Hiroaki Yasuda, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 166 days.

(21) Appl. No.: 09/894,905

(22) Filed: Jun. 29, 2001

(65) Prior Publication Data

US 2002/0014606 A1 Feb. 7, 2002

(30) Foreign Application Priority Data

Jun. 29, 2000 (JP) .................................... 2000-196407

(51) Int. Cl.$^7$ ............................................. G03B 42/08
(52) U.S. Cl. ........................ 250/587; 250/586; 250/584
(58) Field of Search ............................. 250/587, 586, 250/584, 585, 591, 581

(56) References Cited

U.S. PATENT DOCUMENTS

| | | | |
|---|---|---|---|
| 4,258,264 A | | 3/1981 | Kotera et al. |
| 4,276,473 A | | 6/1981 | Kato et al. |
| 4,387,428 A | | 6/1983 | Ishida et al. |
| 4,814,618 A | * | 3/1989 | Saito et al. .................. 250/587 |
| 4,816,679 A | | 3/1989 | Sunagawa et al. |
| 4,922,103 A | | 5/1990 | Kawajiri et al. ............. 250/586 |
| 4,985,630 A | * | 1/1991 | Higaski et al. .............. 250/587 |
| 5,461,238 A | * | 10/1995 | Hara et al. ................. 250/587 |
| 5,533,142 A | * | 7/1996 | Takeo ........................ 382/128 |
| 5,864,146 A | * | 1/1999 | Karellas ..................... 250/581 |
| 6,310,357 B1 | * | 10/2001 | Fuchs et al. ................ 250/587 |
| 6,373,074 B1 | * | 4/2002 | Mueller et al. ............. 250/584 |
| 6,504,168 B2 | * | 1/2003 | Yasuda ....................... 250/587 |
| 6,507,039 B2 | * | 1/2003 | Gebele et al. .............. 250/584 |

FOREIGN PATENT DOCUMENTS

| | | | | |
|---|---|---|---|---|
| JP | 55-12429 | | 1/1980 | ............ G01T/1/10 |
| JP | 55-116340 | | 9/1980 | ............ A61B/6/00 |
| JP | 56-104645 | | 8/1981 | ............ A61B/6/00 |
| JP | 60-111568 | | 6/1985 | ............ H04N/1/04 |
| JP | 60-236354 | | 11/1985 | ............ H04N/1/04 |
| JP | 1-101540 | | 4/1989 | ........... G03B/42/02 |
| JP | 04157440 A | * | 5/1992 | ........... G03B/42/02 |
| WO | 99/28765 | | 6/1999 | ............ G01T/1/29 |

OTHER PUBLICATIONS

Abstract, 01–101540, Apr. 19, 1989.

* cited by examiner

*Primary Examiner*—Constantine Hannaher
*Assistant Examiner*—Albert Gagliardi
(74) *Attorney, Agent, or Firm*—Sughrue Mion, PLLC

(57) ABSTRACT

A radiation image data readout apparatus in which read out is performed so that a detected light quantity for each CCD element of each CCD sensor is set at a quantity below the saturation charge quantity of each CCD element, and the level of noise is reduced. The radiation energy stored on a readout-line of a stimulable phosphor sheet is estimated, and based on the estimated quantity of radiation energy, a controller sets the readout conditions, which are formed of the charge accumulation time of the readout line and the binning conditions, and readout is performed by a line sensor according to these conditions.

47 Claims, 8 Drawing Sheets

SECT. I-I

METHOD OF AND APPARATUS FOR READING OUT RADIATION IMAGE DATA

BACKGROUND OF THE INVENTION

1. Field of the Invention

The present invention relates generally to a method of and apparatus for reading out radiation image data, and more particularly to a method of and apparatus for reading out the radiation image data stored on a stimulable phosphor sheet by use of a line sensor formed of one or more CCD sensors.

2. Description of the Related Art

There are in wide use today technologies for obtaining an image signal of a radiation image by use of a stimulable phosphor sheet. Such stimulable phosphor sheets have a layer containing stimulable phosphor, which are supported on a sheet-type substrate, that cumulatively store a portion of the radiation passing through the body of a subject, such as the body of a human being, and emit a stimulated emission corresponding to the radiation energy stored thereon upon irradiation thereof by a stimulating light such as visible light or a laser beam. In such technologies, radiation image energy that has been once cumulatively stored on a stimulable phosphor sheet is caused to be emitted as a stimulated emission by scanning each pixel of the stimulable phosphor sheet in order with a deflected laser beam or other stimulating light; the stimulable emission is then photoelectrically read out in order by a photoelectrical readout means and an image signal is obtained. On the other hand, after the radiation image signal has been readout, the stimulable phosphor sheet is irradiated with an erasing-light that causes the radiation energy remaining thereon to be dissipated, and the sheet can be reused for the same operation of storing and reading out a radiation image (refer to Japanese Unexamined Patent Publication Nos. 55(1980)-12429, 55(1980)-116340, 56(1981)-104645, and etc.).

In addition, a system has been proposed in which, in order to raise the efficiency of quantum detection upon formation of the radiation image, that is, the absorption rate of the radiation energy, the efficiency of the output of the stimulated emission, and the efficiency of detecting the stimulated emission, the radiation absorbing function and the energy accumulating function occurring in a conventional stimulable phosphor are separated, and a phosphor having superior radiation absorption properties and a phosphor showing superior response to stimulable emission are each used separately for absorbing radiation and accumulating radiation image data, respectively: using the phosphor superior in absorbing radiation (radiation absorption use phosphor), the radiation is absorbed and light in the visible to UV spectra is emitted; this emitted light is absorbed and the energy therefrom accumulated using the phosphor showing superior response to stimulated emission (dedicated accumulation-use phosphor); this accumulated energy is stimulated by the irradiation thereof with a stimulating light in the visible to infrared range, causing a stimulated emission to be emitted; and the light of the stimulated emission is photoelectrically readout sequentially by a photoelectrical readout means and a image signal is obtained (refer to Japanese Patent Application No. 11(1999)-372978).

The image signal obtained by these systems is subjected to gradation processing, frequency processing, and etc. image processing applied in diagnostic reading, and after being subjected to such processing, the image signal is recorded on film as a diagnostic image (final image), or displayed on a high-resolution CRT display for diagnostic use by a doctor, etc. On the other hand, if the stimulable phosphor sheet is irradiated by an erasing-light, the energy remaining on the stimulable phosphor sheet after the radiation image data once stored thereon has been readout is erased, and it becomes possible to again cumulatively record radiation image data on the sheet, and it possible to repeatedly use the sheet for such operations.

Here, according to the radiation image data readout apparatus occurring in the radiation image recording and reproducing systems described above, a configuration has been proposed with a view to shortening the readout time for the stimulated emission, reducing the cast and the size of the apparatus: a line-light source is used as the stimulating-light source for irradiating the stimulable phosphor sheet with a line-shaped stimulating-light; a line sensor formed of a plurality of photoelectric converting elements arranged along the lengthwise direction (hereinafter referred to as the main-scanning direction) of the line-shaped portion of the stimulable phosphor sheet irradiated by the stimulating-light emitted from the line-light source; and a scanning apparatus moving in a direction substantially perpendicular to the lengthwise direction of aforementioned line-shaped portion (hereinafter referred to as the sub-scanning direction), from one side to another of the sheet relative to the line-light source and the line sensor (refer to Japanese Unexamined Patent Publication Nos. 60(1985)-111568, 60(1985)-236354, 1(1989)-101540, etc.).

However, because of remarkable performance advances such as increased pixel density, improved sensitivity, noise reduction, reduction in image size, and etc. attainable due to innovations in micro-processing used in the manufacture of semiconductors in recent years, CCD sensors are frequently used as the photoelectric converting elements that form the line sensor described above.

However, there is a limit inherent in a line sensor formed of one or more CCD sensors regarding the quantity of charge that can be accumulated before the charge saturation quantity is reached, and because each CCD element of each CCD sensor can not detect quantities of light above a fixed quantity, for portions of a stimulable phosphor sheet where a large amount of radiation data (radiation energy) have been accumulated (high-radiation zones), a precise measurement thereof cannot be obtained, and a problem arises in that the range with respect to the quantity of light possible of being read out (dynamic range) when a series of CCD sensors are used as a line sensor is said to be narrow.

Therefore, as described in PCT International Publication No. WO99/28765, a method for expanding the dynamic range of the line sensor has been proposed, wherein, readout of a quantity of light below the saturated charge quantity is performed a plurality of times, and by adding together the data obtained by this plurality of readout operations, each CCD element does not become saturated.

However, in the method proposed in PCT International Publication No. WO99/28765, because the actual quantity of radiation energy stored on each portion of a stimulable phosphor sheet is not grasped and readout of low-quantity of light is simply performed repeatedly for high-radiation zones, each CCD element may become substantially saturated, and there is a possibility that it will not be possible to read out accurate data. Further, because the noise occurring when readout is performed n times is n times as large as the noise occurring when readout is performed only once, for portions of a stimulable phosphor sheet which have accumulated only a small quantity of radiation energy (low-radiation zones), the higher the number of times readout is performed, the lower the S/N ratio becomes, and a problem arises in that the quality of the image is thereby deteriorated.

SUMMARY OF THE INVENTION

The present invention has been developed in consideration of the circumstances described above, and it is a primary object of the present invention to provide a method and apparatus for always performing read out of radiation image data at a detected light quantity range below the charge saturation quantity of the each CCD element of CCD sensors forming a line sensor, which controls the increase of noise due to performing readout a plurality of times and expands the dynamic range of the line sensor.

The radiation image data readout method according to the present invention comprises: irradiating with a stimulating-light a portion of the face of a stimulable phosphor sheet on which radiation image data has been stored; receiving and photoelectrically converting, by use of a line sensor formed of one or more CCD sensors each divided into a plurality of pixel zones extending along the lengthwise direction of the irradiated portion of the stimulable phosphor sheet, the stimulated emission emitted from the portion of the stimulable phosphor sheet that has been irradiated in a line-shape by the stimulating-light, or the portion of the back side of said stimulable phosphor sheet corresponding to the portion that has been irradiated by the stimulating-light; moving the line-light source emitting the stimulating-light and the line sensor relatively, in a direction different from that of aforementioned lengthwise direction, from one end of the stimulable phosphor sheet to the other and sequentially reading out the output of the line sensor corresponding to each readout line according to aforementioned movement; and obtaining the output of each of the pixel zones at each position of the readout lines, wherein when readout is performed, the radiation energy stored on the readout line of each position is estimated, and based on said estimated quantity of radiation energy, the readout settings, which are formed of the line sensor charge accumulation time and the binning conditions, are set, and the readout lined are readout according to said readout conditions.

A fluorescent lamp, a cold cathode fluorescent lamp, an LED array, and etc. can be adopted as the line-light source. Also, the line-light source is not limited to being a light source element in the form of a line, such as aforementioned fluorescent lamp, etc., but can be a light source that emits the stimulating-light in a line form, including a broad are a laser beam, etc. The line-light emitted from the line-light source can be emitted in a continuous manner or can be a pulse light, which is repeatedly emitted and stopped, however, from the standpoint of reducing the noise level, it is desirable that a high-output pulse light is used.

In addition, the expression "moving the line-light source emitting the stimulating-light and the line sensor relatively, in a direction different from that of aforementioned lengthwise direction, from one end of the stimulable phosphor sheet to the other" refers to the direction substantially perpendicular to the lengthwise direction of the line-light source and the line sensor, that is to say, it is desirable that it be the direction of the short axis, however, it is not limited to being this direction; for example, the line-light source and the line sensor can be moved in a direction displaced from the direction perpendicular to the lengthwise direction of thereof in a diagonal direction, within the range in which the stimulated light can be irradiated over substantially the entire surface of the stimulable phosphor sheet in a zigzag motion etc.

Note that the line-light source and the line-light sensor can be provided on the same side of the sheet or on mutually opposite sides of the sheet. However, when a configuration in which they are each installed separately is adopted, the substrate of the sheet must be transparent to the stimulable emissions so that the stimulable emission can pass through the side opposite the side that from which the stimulating-light enters.

The expression "one or more CCD sensors" constituting a line sensor refers to one or more solid-state detecting elements each formed of a plurality of CCD elements each covering a single pixel.

The line sensor according to the present invention is formed of one or more CCD sensors, i.e., of a CCD sensor or a plurality of CCD sensors arranged in a line. Note that for cases in which the line sensor is formed of a plurality of CCD sensors arranged in a line, the CCD sensors can be arranged in a single line along the lengthwise direction of aforementioned lengthwise direction, or can be arranged in each of the lengthwise direction and the direction perpendicular thereto in order to improve the focusing efficiency for the stimulated emission emitted from the stimulable phosphor sheet.

Of course, the stimulable phosphor sheet can be a sheet formed using normal stimulable phosphor that combines the properties of both stimulable phosphor that absorbs radiation and stimulable phosphor that accumulates radiation energy, that is, that stores radiation image data. However, because of the following reason, it is preferable that the stimulable phosphor sheet contains only dedicated accumulation-use stimulable phosphor. That is, according to a system proposed in Japanese Patent Application No. 11(1999)-372978, the radiation absorbing function and the energy accumulating function occurring in a conventional stimulable phosphor sheet are separated, and a phosphor having superior radiation absorption properties and a phosphor showing superior response to stimulable emission are each used separately for absorbing radiation and accumulating radiation image data, respectively: using the phosphor superior in absorbing radiation (radiation absorption-use phosphor), the radiation is absorbed and light in the visible to UV spectra is emitted; this emitted light is absorbed and the energy therefrom accumulated using the phosphor showing superior response to stimulated emission (dedicated accumulation-use phosphor); this accumulated energy is stimulated by the irradiation thereof with a stimulating light in the visible to infrared range, causing a stimulated emission to be emitted; and the stimulated emission is photoelectrically readout sequentially by a photoelectrical readout means and a image signal is obtained, wherein the efficiency of quantum detection upon formation of the radiation image, that is, the absorption rate of the radiation energy, the efficiency of the output of the stimulated emission, and the efficiency of detecting the stimulated emission can be raised overall.

Here, the dedicated accumulation-use phosphor absorbs the light in the UV to visible spectra emitted from the absorption-use phosphor, and accumulates the energy thereof as image data. However, because said emitted light in the UV to visible spectra has been emitted from the absorption-use phosphor upon the absorption of radiation thereby, the image data accumulated on the stimulable phosphor sheet is also to be referred to as radiation image data.

In addition, "readout line" refers to the line-shaped portion of the stimulable phosphor sheet that has been irradiated by the stimulating-light emitted in a line-shape and which is to be read out by the line sensor. According to the radiation image data readout method of the present invention, each time a readout line is to be read out, the quantity of radiation energy accumulated on said readout line is estimated, and based on said estimated quantity of radiation energy, the readout settings, which are formed of the charge accumulation time of the line sensor and the binning conditions, are set and readout of the readout line is performed according to said readout conditions; however, regarding the method of estimating the quantity of radiation energy accumulated on the readout line, more specifically, the first or second method described below can be used.

1. The quantity of radiation energy accumulated on the readout line is estimated based on the data obtained by reading out the preceding readout line.

Here, "the preceding readout line" refers to the readout line directly preceding the readout line that is to be read out. According to this method, by making use of the fact that the quantity of radiation energy accumulated on each of two adjacent readout lines is close, because the data of the previous line forming a portion of the radiation image data stored on the stimulable phosphor sheet is used in estimating the quantity of radiation energy accumulated on the readout line that is to be read out, it is not necessary to obtain the data only for estimating the quantity of radiation energy accumulated on the readout line that is to be read out. Therefore, the time required for determining the readout settings can be shortened, and readout having a high possible efficiency can be provided.

2. The quantity of radiation energy accumulated on the readout line that is to be read out is estimated based on the data obtained by conducting a preliminary reading of said readout line.

Here, "conducting a preliminary reading" refers to conducting a readout process different from the actual read out (main read out), and comprises using a shortened readout time, stimulation by a stimulating-light of a relatively weak strength, or a shortened charge accumulation time to obtain the data for estimating the quantity of radiation energy accumulated on each readout line of the stimulable phosphor sheet. More specifically, after once conducting a preliminary reading over the entire stimulable phosphor sheet, the main read out can be performed. However, in order to improve the readout efficiency potential, it is preferable to perform the main read out of each readout line directly after conducting a preliminary reading of said each readout line. In this case, in order to improve the accuracy with which the quantity of radiation energy accumulated on the readout line is estimated, the preliminary reading and the main read out of each readout line can be performed for the readout line of exactly the same position (in this case, it is necessary to once stop the movement in the sub-scanning direction), because of the reason that the time required for conducting a preliminary reading is extremely short, if the movement in the sub-scanning direction is not stopped while the preliminary reading and the main readout are performed alternately, there is a slight difference in the position of the readout line of which the preliminary reading is performed and the readout line of which the main readout is performed. However, control of the scanning operation can be simplified and the readout efficiency is improved.

If this method is used, because the quantity of radiation energy accumulated on a readout line that is to be subjected to main read out (or a readout line that is slightly displaced from the readout line to be subjected to main read out) is estimated based on data obtained by conducting a preliminary reading of said readout line, the accuracy in estimating the quantity of accumulated radiation energy can be improved.

According to the present invention, the "readout conditions for each readout line" refer to the charge accumulation time of the line sensor and the binning conditions for the line sensor under which each of said readout lines is read out. According to the present invention, the charge accumulation time of the line sensor is determined, based on the quantity of radiation energy accumulated on a readout line that is to be readout, so that the quantity of light detected by each CCD element is smaller than the charge saturation quantity of the CCD element, even for the portion of the readout line on which the most radiation energy has been accumulated. In this way, because the quantity of light detected by each CCD element of the CCD sensors constituting the line sensor can be reliably made to be below the charge saturation quantity thereof, readout can be performed accurately, even for the high-radiation zones of the stimulable phosphor sheet.

In addition, for cases in which the line sensor is formed of a plurality of CCD sensors, if the charge accumulation time is determined so that the quantity of light detected at the readout position corresponding to each CCD element is below the charge saturation quantity of each CCD element, even for the portion of the readout line on which the most radiation energy has been accumulated, readout can be performed more efficiently. Thus, in this case, it is preferable that the charge accumulation time be set for each CCD sensor. Note that for cases in which the line sensor is formed of a plurality of CCD sensors arranged in a line in the direction along aforementioned lengthwise direction as well as in the direction perpendicular to said lengthwise direction, in order to provide for simplicity in control, it is preferable that a similar charge accumulation time be determined for the CCD sensors at the same position as that at which the stimulated emission is emitted.

Note that when determining the charge accumulation time, the quantity of detected light for each CCD element can be any quantity below the charge saturation quantity of the CCD element, however, because of the reason that the number of times readout is performed should be reduced to as few as possible in order to reduce noise, it is desirable that the charge accumulation time is determined so that readout be performed such that the quantity of detected light for each CCD element is close to the charge saturation quantity of the CCD element.

Further, "binning" refers to a technique of not reading out the signal from each of a plurality of pixels zones of the CCD element one by one, but combining and reading out the signal from a plurality of pixel zones at one time. By performing binning, because the signals from a plurality of pixel zones are averaged and the data from said plurality of pixel zones formed based on said averaged signal, although a slight deterioration in resolution is incurred, because the number of times readout is performed can be reduced, the effectiveness in reducing noise and improving the readout speed is great, especially with respect to low-radiation zones.

The "binning conditions", which constitute one of the readout conditions according to the present invention, refer to the number of pixel zones to be binned (the number of times of binning) for a readout line: according to the present invention, the line sensor binning conditions are determined so that, based on the estimated quantity of radiation energy accumulated on a readout line, the number of times binning is performed is smaller for the portions of the readout line on which more radiation energy has been accumulated, and the number of times binning is performed is larger for the portions of the readout line on which less radiation energy has been accumulated. Thus, after estimating the quantity of radiation energy accumulated on each position of the readout line, the noise is reduced and the readout speed improved with respect to the low-radiation zones, and the saturation of the accumulating circuit due to performing binning an excessive number of times can be prevented with respect to the high-radiation zones.

Still further, for cases in which the line sensor is formed of a plurality of CCD sensors, in order to more accurately perform readout, it is preferable that the binning conditions are determined for each CCD sensor at the same time that the charge accumulation time described above is determined.

The radiation image data readout apparatus according to the present invention comprises: a line-light source for irradiating with a stimulating-light emitted in a line-shape a portion of the surface of a stimulable phosphor sheet storing radiation image data; a line sensor formed of one or more CCD sensors for receiving and photoelectrically converting the stimulated emission emitted from the portion of the stimulable phosphor sheet that has been irradiated by the stimulating-light emitted in a line-shape or the portion of the rear face of the stimulable phosphor sheet corresponding to the portion of the stimulable phosphor sheet that has been irradiated by the stimulating-light emitted in a line-shape; a scanning means for moving the line-light source emitting the stimulating-light and the line sensor relatively, in a direction different from that of aforementioned lengthwise direction, from one end of the stimulable phosphor sheet to the other; and a readout means for sequentially reading out the output of the line sensor corresponding to each readout line according to aforementioned movement, and obtaining the output of each of the pixel zones at each position moved to; wherein the readout means further comprises a readout conditions controlling means for estimating the radiation energy stored on the readout line of each position moved to, and, based on said estimated quantity of radiation energy, setting the line sensor charge accumulation time and the binning conditions.

A stimulable phosphor sheet that is to be subjected to the radiation image readout method according to the present invention contains a stimulable phosphor capable of absorbing light in the wavelength range of UV to visible to accumulate the energy thereof, being stimulated by light in the wavelength range of visible to infrared, and emitting as stimulated emission the energy accumulated thereon.

The radiation image data readout apparatus according to the present invention further comprises a readout conditions controlling means for estimating the radiation energy stored on the readout line of each position moved to, and, based on said estimated quantity of radiation energy, setting the line sensor charge accumulation time and the binning conditions: more specifically, it is preferable that the readout conditions controlling means, in order to shorten the time required for determining the readout conditions, makes use of the fact that the quantity of radiation energy accumulated on each of two adjacent readout lines is close and estimates, based on the data read out from the preceding readout line, the quantity of radiation energy accumulated on the readout line that is to be read out; or, in order to improve the accuracy in estimating the quantity of radiation energy, conducts a preliminary reading of the readout line to be read out, and estimates the quantity of radiation accumulated thereon based on the data obtained by said preliminary reading.

Regarding the charge accumulation time, which is one of the readout conditions for each readout line, based on the estimated quantity of radiation energy, the readout conditions controlling means determines, for each readout line, the charge accumulation time of the line sensor so that the quantity of light detected for each CCD element is smaller than the charge saturation quantity of the CCD element, even for the portion of the readout line on which the most radiation energy has been accumulated. In this way, because it is possible for each CCD element of the CCD sensors constituting the line sensor to reliably detect a quantity of light in the range smaller than the charge saturation quantity, accurate read out can be performed even for the high-radiation zones of a stimulable phosphor sheet.

In addition, for cases in which the line sensor is formed of a plurality of CCD sensors, it is preferable that the readout conditions controlling means controls the readout conditions by separately setting the charge accumulation time for each CCD sensor of each readout line so that the quantity of light detected by each CCD element corresponding to a position on the readout line is smaller than the charge saturation quantity of the CCD element, even for the portion of the readout line on which the most radiation energy has been accumulated. In this way, readout can be performed still more efficiently. Note that for cases in which the line sensor is formed of a plurality of CCD sensors arranged in a line in the direction along aforementioned lengthwise direction as well as in the direction perpendicular to said lengthwise direction, in order to provide for simplicity in control, it is preferable that a similar charge accumulation time be determined for the CCD sensors at the same position as that at which the stimulated emission is emitted.

Note that when determining the charge accumulation time, the quantity of detected for each CCD element can be any quantity below the charge saturation quantity of the CCD element, however, in order to reduce the number of times readout is performed, it is desirable that the readout conditions controlling means determines the charge accumulation time so that readout is performed such that the quantity of detected light is close to the charge saturation quantity of the CCD element.

In addition, according to the present invention, after the readout conditions controlling means estimates the quantity of radiation energy accumulated on each position of the readout line that is to be read out, with respect to performing read out of the low-radiation portions of the readout line, the noise can be reduced and the readout speed improved, and with respect to the high-radiation portions of the readout line, in order to prevent the saturation of the binning accumulation circuit due to performing binning an excess number of times, it is preferable that the binning conditions of the line sensor are set, based on the estimated quantity of radiation energy accumulated on the readout line, so that the number of times binning is performed is made smaller for the portion of the readout line on which more radiation energy has been accumulated and the number of times binning processing is performed is made larger for the portion of the readout line on which less radiation energy has been accumulated.

Further, in the same way as occurs when the charge accumulation time is to be set as described above, for cases in which the line sensor is formed of a plurality of CCD sensors, in order to more accurately perform readout, it is preferable that the readout conditions controlling means determines the binning conditions separately for each CCD sensor.

According to the radiation image data readout method and apparatus therefor according to the present invention, when reading out each readout line, because the radiation energy accumulated on each said readout line is estimated, and based on said estimated quantity of radiation energy, the charge accumulation time is determined and the readout line is readout, readout can be performed so that each CCD element of the CCD sensors forming the line sensor always detect a quantity of light smaller than the charge saturation quantity of said CCD element. Further, when setting the charge accumulation time, because the quantity of radiation energy to be readout that has been accumulated on the readout line is estimated, it becomes possible to determine the charge accumulation time of each CCD sensor so that readout of the readout line is performed in a manner that the quantity of detected light for each CCD element is as close as possible to the charge saturation quantity of the CCD element, and the number of times readout is performed can be reduced.

In addition, according to the radiation image data readout method and apparatus therefor according to the present invention, when reading out each readout line, because the radiation energy accumulated on each said readout line is estimated, and based on said estimated quantity of radiation energy, the binning conditions of the line sensor are determined: for low-radiation zones of the readout line that is to be read out, the number of times binning is performed can be made large, and for high-radiation zones, the number of times binning is performed can be made small; whereby the noise can be reduced and the readout speed can be improved for readout of the low-radiation zones, and the saturation of the binning accumulation circuit due to performing binning an excessive number of times can be prevented for readout of the high-radiation zones.

Note that according to the radiation image data readout method and apparatus therefor according to the present invention, when estimating the radiation energy accumulated on the readout line that is to be readout, if said estimating is based on the data obtained by conducting a preliminary reading on the readout line preceding the readout line that is to be read out, the time required to determine the readout conditions can be shortened and the readout speed improved. Further, if a preliminary reading is conducted for the readout line that is to be readout and the quantity of radiation energy accumulated on said readout line is estimated based on the data obtained by said preliminary reading, the accuracy with which the quantity of radiation energy stored on said readout line is estimated can be improved.

Further, according to the radiation image data readout method and apparatus therefor according to the present invention, for cases in which the line sensor is formed of a plurality of CCD sensors, because it is possible to determine the charge accumulation time and the binning conditions separately for each CCD sensor, readout can be performed still more efficiently.

Still further, if the stimulable phosphor sheet that is to be the subject of the radiation image data readout method and apparatus therefor according to the present invention contains the dedicated accumulation-use stimulable phosphor described above, a higher level of image resolution can be provided.

DESCRIPTION OF THE PREFERRED EMBODIMENTS

Hereinafter, with reference to the drawings, the preferred embodiments of the radiation image data readout apparatus according to the present invention will be explained.

Figure 1:
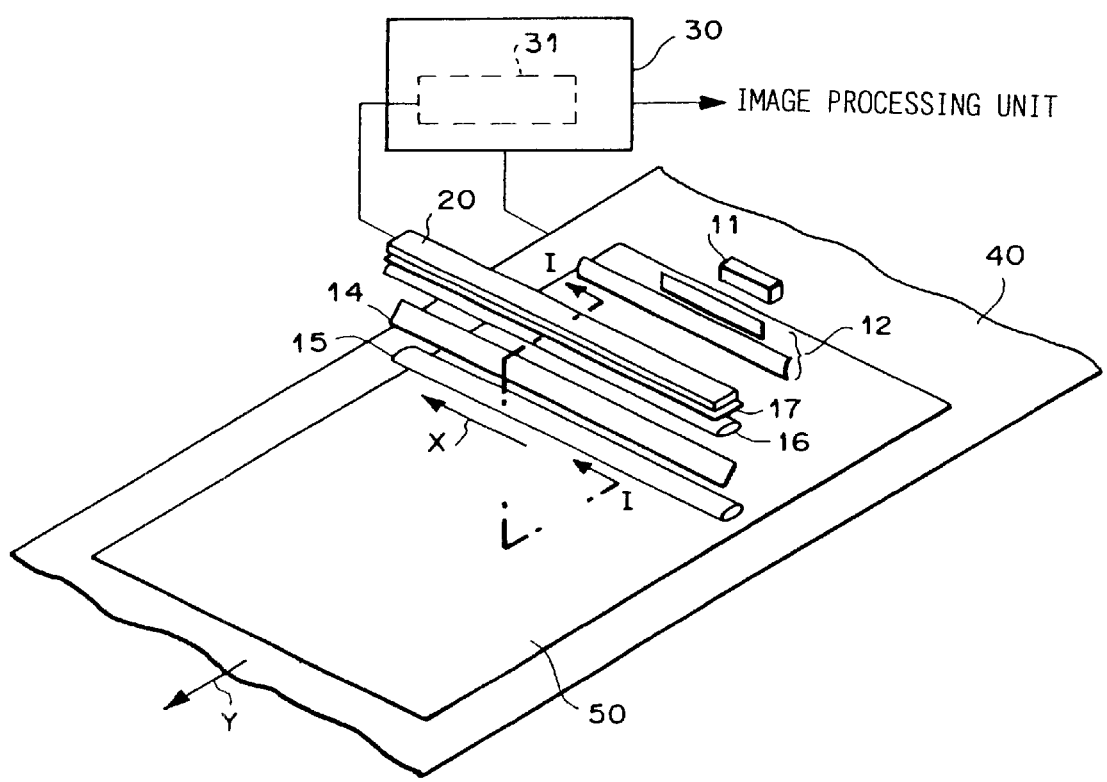
FIG. 1 is a schematic drawing of the configuration of a radiation image data readout apparatus according to the first embodiment of the present invention.
Figure 2:
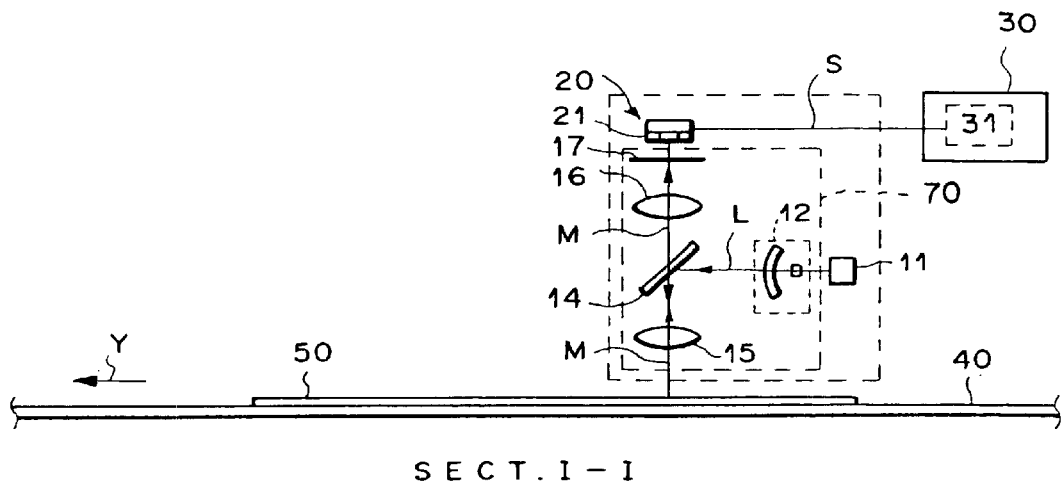
FIG. 2 is a cross-sectional view along the I—I line of the radiation image data readout apparatus shown in FIG. 1.
Figure 3:
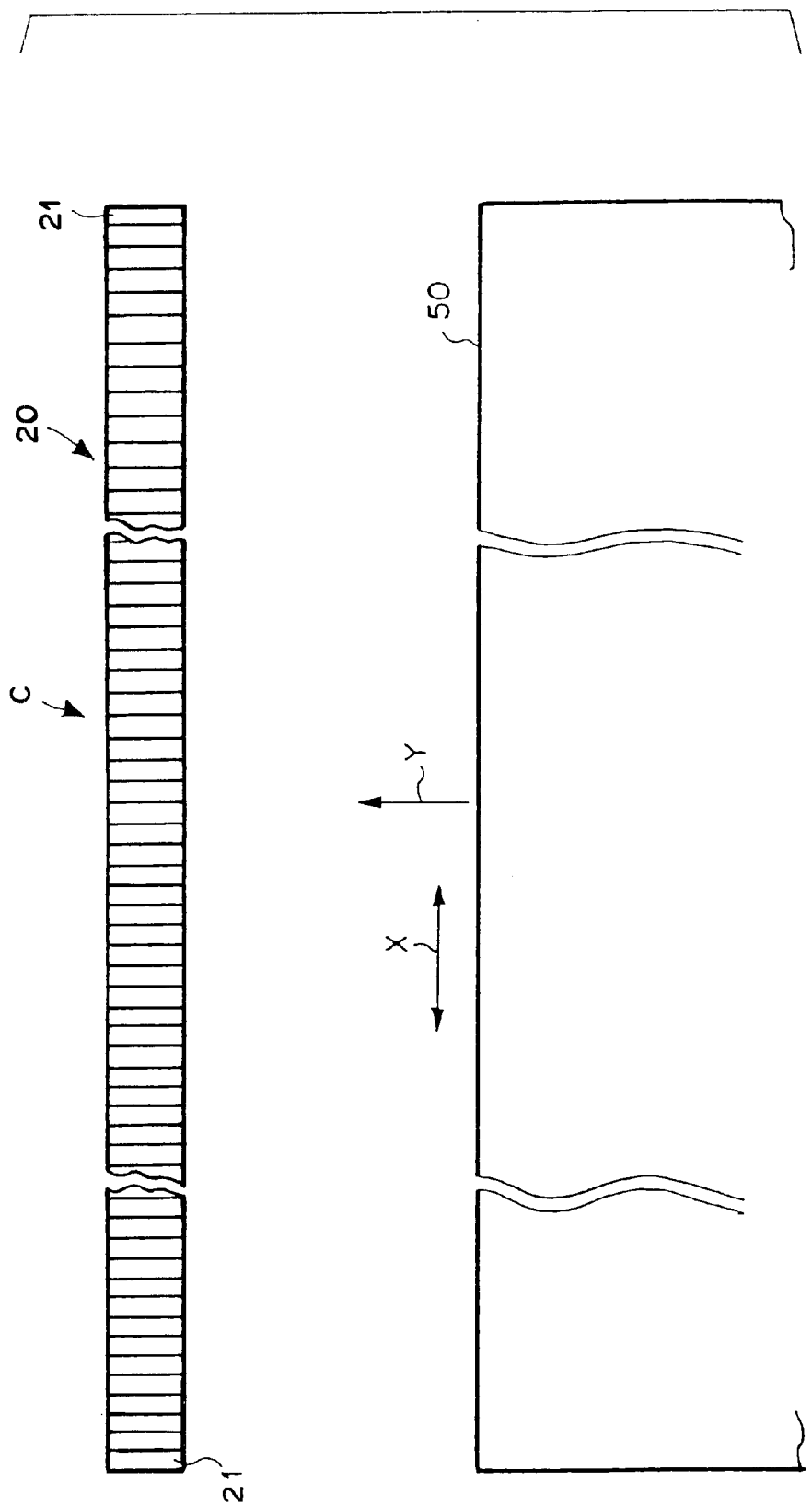
FIG. 3 is a detailed drawing of one example of the line sensor of the radiation image data readout apparatus as shown in FIGS. 1 and 2.

FIG. 1 is a perspective view of a radiation image data readout apparatus according to the first embodiment of the present invention. FIG. 2 is a cross-sectional view along the I—I line of the radiation image data readout apparatus shown in FIG. 1, and FIG. 3 is a detailed drawing of the line sensor of the radiation image data readout apparatus shown in FIGS. 1 and 2.

The radiation image data readout apparatus shown comprises an image data readout means provided with a scanning belt 40 for conveying in the direction of arrow Y a stimulable phosphor sheet 50 (hereinafter referred to as a sheet), which has been placed thereon, for cumulatively storing radiation image data, a broad area laser 11 (hereinafter referred to as a BLD) for emitting 2-dimensional stimulating-light L (hereinafter referred to simply as stimulating-light) in a line-shape onto the surface of the sheet 50 in a direction substantially parallel thereto, an optical system 12 formed of a combination of a collimator lens for focusing the line-shaped stimulating-light L emitted from the BLD 11 and a toric lens for spreading the beam in one direction only, a dichroic mirror 14 disposed at a 45° slant with respect to the sheet 50 so as to reflect the stimulating light L and transmit the stimulated emission described below, a refractive-index distributed lens array (provided as an arrangement of a plurality of refractive-index distributed lenses, and hereinafter referred to as the first SELFOC lens array) 15 for focusing the stimulating-light L reflected by the dichroic lens 14 onto the sheet 50 in a line-shape extending along the direction of the arrow X, and making the stimulated emission M, which corresponds to the accumulated radiation image data, emitted from the sheet 50 into a parallel flux of light, a second SELFOC lens array 16 for focusing onto the line sensor 20 described below the stimulated emission M made into a flux of light by the first SELFOC lens array 15 and transmitted by the dichroic mirror 14, a stimulating-light cutoff filter 17 for cutting off the slight amount of stimulating-light L reflected from the surface of the sheet 50 and mixed with the stimulated emission M transmitted by the second SELFOC lens array 16, a line sensor 20 for receiving and photoelectrically converting, according to the readout conditions described below, the stimulated emission M transmitted by the stimulating-light cutoff filter 17, a controlling means 31 for determining the readout conditions of the line sensor 20 for each readout line; wherein said image data readout means 30 computes an image signal by correlating the position of the sheet 50 and the data S obtained by reading out the radiation image stored on said sheet 50 according to the readout conditions, and outputs the image signal.

The first SELFOC lens array 15 operates for focusing the stimulated emission M emitted by the sheet 50 at a 1 to 1 size ratio onto the dichroic mirror 14; the second SELFOC lens array 16 is on the light-receiving side of the line sensor, and operates as an image surface for focusing at a the image of the stimulated emission M occurring above the dichroic mirror 14.

In addition, the optical system 12 formed of the collimator lens and the toric lens spreads the stimulating-light, that has been emitted from the BLD 11, onto a predetermined illumination range on the dichroic mirror 14.

As shown in the detailed drawing of the line sensor 20 shown in FIG. 3, the line sensor 20 is divided into a plurality of pixel regions 21 in the direction of arrow X (the lengthwise direction of the line sensor). In the current example, the line sensor is formed of one CCD sensor (C), and said one CCD sensor is divided into the plurality of pixel regions 21.

Next, the operation of the radiation image data readout apparatus according to the present embodiment will be explained.

First, the sheet 50, which has been placed on the conveyor belt 40, storing radiation image data is conveyed in the direction indicated by the arrow Y by the movement of the conveyor belt in the direction indicated by the arrow Y. Here, the speed with which the sheet 50 is conveyed is equal to the speed with which the conveyor belt moves; the speed of the conveyor belt 40 is input to the image image data readout means 30.

On the other hand, the BLD 11 emits the stimulating-light L in a line-shape on to the surface of the sheet 50 in a substantially parallel direction, and this stimulating-light L is made into a parallel beam by the optical system 12 formed of a collimator lens and a toric lens and which has been disposed in the optical path of the stimulating-light L, and this stimulating-light L is made into a parallel beam by the optical system 12 formed of a collimator lens and a toric lens and which has been disposed in the optical path of the stimulating-light L, enter the surface of the sheet 50 at a direction perpendicular thereto, and is focused by the first SELFOC lens array 15 Y into a line-shape extending in the direction of the arrow X above the sheet 50.

Upon stimulation by the line-shaped stimulating-light L, a stimulated emission M having intensity corresponding to the radiation image data stored on the sheet 50 is emitted from the focusing zone of said sheet 50 and the surrounding environs thereof. This stimulated emission M is made into a parallel flux of light by the first SELFOC lens 15, transmitted by the dichroic mirror 14, and focused onto each of the pixel regions 21 of the line sensor 20 by the second SELFOC lens 16. Here, the small amount of the stimulating-light L reflected from the sheet 50 that has become mixed with the simulated emission M transmitted by the second SELFOC lens array 16 is cutoff by the stimulating-light cutoff filter 17.

For the sake of simplicity of explanation, the optical system between the sheet 50 and the line sensor 20 has been provided in a 1:1 ratio image focusing system, however, an magnifying and/or reducing optical system can also be employed. However, from the standpoint of improving the focusing efficiency, it is preferable that a 1:1 ratio system or a magnifying system is used.

Figure 4:
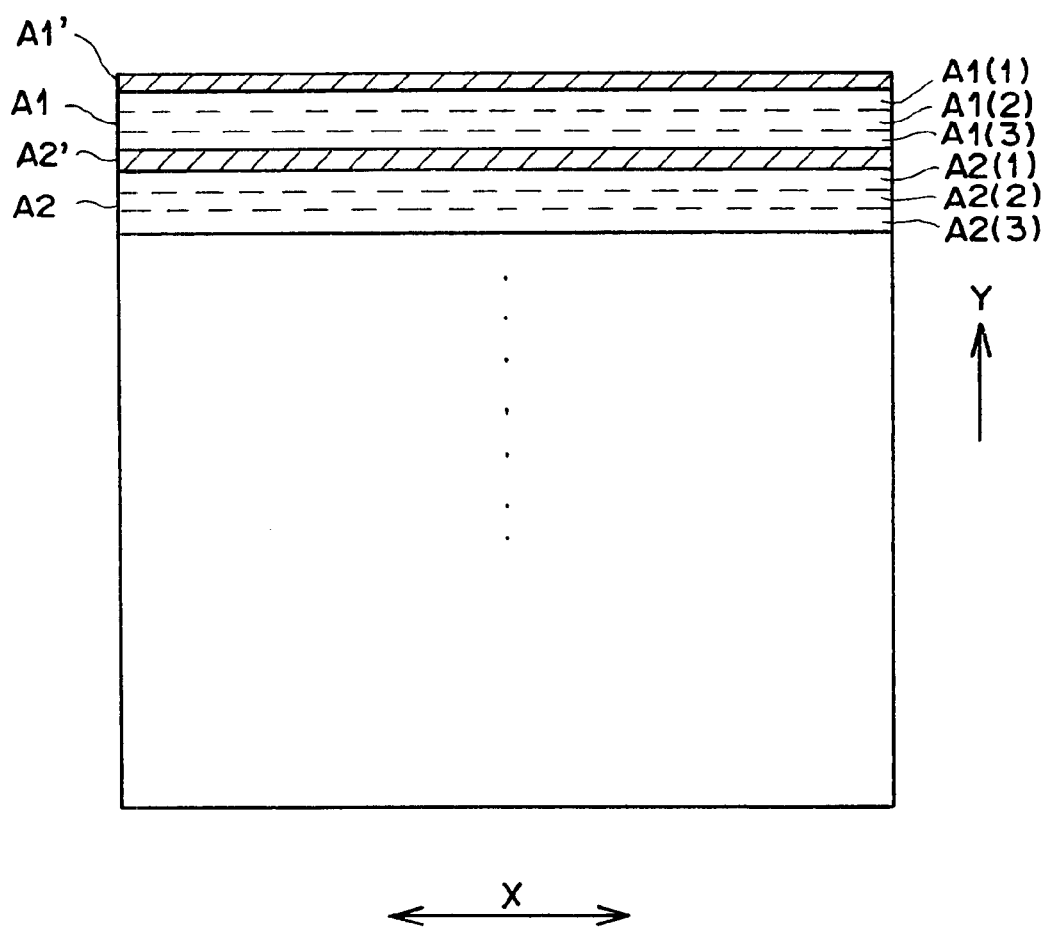
FIG. 4 is a drawing provided for explanation of one type of readout performed by the radiation image readout apparatus shown in FIGS. 1 and 2.
Figure 5:
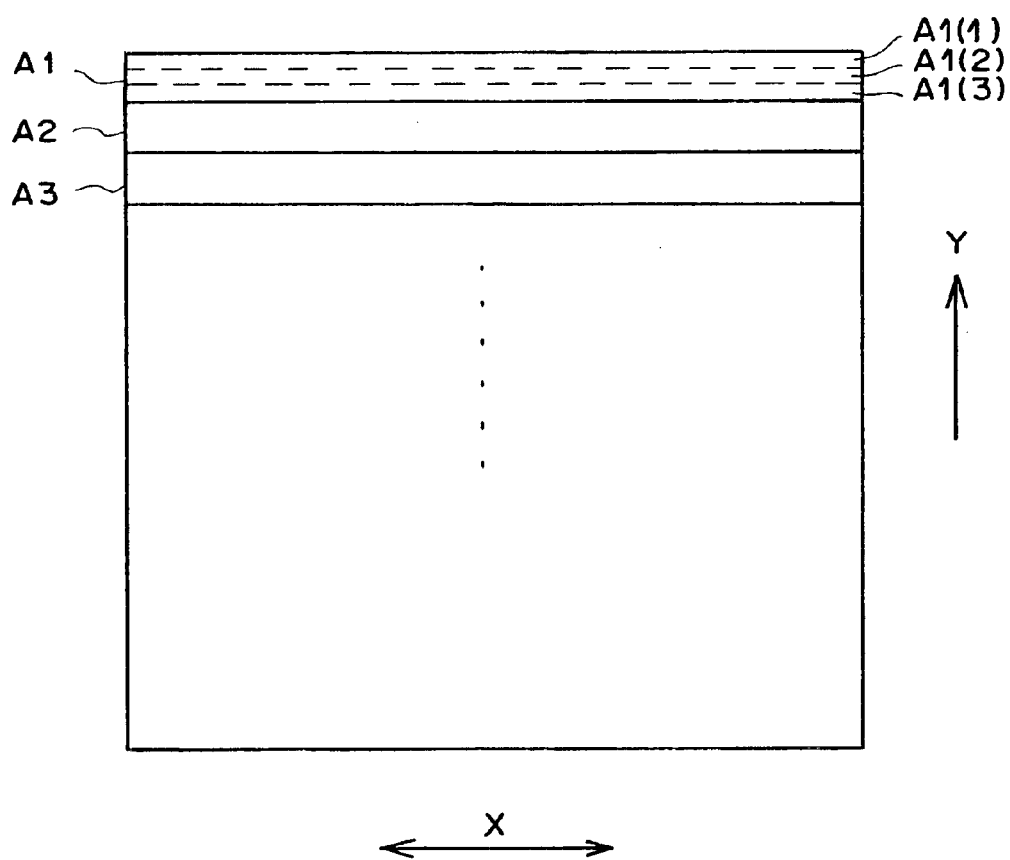
FIG. 5 is a drawing provided for explanation of another type of readout performed by the radiation image readout apparatus shown in FIGS. 1 and 2.

FIG. 4 shows each readout line of a sheet 50. As shown in the drawing, first, the line sensor 20 conducts a preliminary reading (a shortened readout) of the readout line A1', and outputs the data Q1' obtained by said preliminary reading to the controlling means 31. Based on the data Q1', the controlling means 31 estimates the radiation energy stored on each position occurring in the direction of the arrow X of the readout line A1, determines, based on the estimated quantity of radiation energy, the charge saturation time for the CCD sensor (C) so that the quantity of detected light for each CCD element is below the charge saturation quantity of the CCD sensor, even for high-radiation zones, and, according to the distribution of the accumulated radiation energy occurring in the direction of the arrow X, determines the binning conditions. That is to say, the binning conditions are set so as to ensure that: the number of pixel regions 21 binned together is large for low-radiation zones so that the number of times readout and noise are reduced; and the number of pixel regions 21 binned together is small for high-radiation zones so that the binning circuit does not become saturated.

According to the charge accumulation time and the binning conditions determined by the controlling means 31, the line sensor 20 performs readout (main readout) of the readout line A1 a plurality of times, and obtains data Q1.

That is to say, the line sensor 20, as shown by the line in FIG. 4, reads out, according to the charge accumulation time and binning conditions set by the controlling means 31, the readout lines A1(1), A1(2), and A1(3), and obtains data Q1(1), Q1(2), and Q1(3), and inputs said data Q1(1), Q1(2), and Q1(3) into the image data readout means 30; said image data readout means 30 adds the data Q1(1), Q1(2), and Q1(3) together and obtains the data Q1 of the line A1.

By repeating the procedure described above, the data Q2 of the readout line A2 can be obtained.

The image data readout means 30 cumulatively stores the data Q1, Q2, etc., obtained in this way of readout each readout line A1, A2, etc., in memory zones provided corresponding to each position of the sheet 50 as corresponding image signals S, based on the speed of the conveyor belt 40. Afterwards, the image data readout means 30 outputs these stored image signals S as image data to the image processing apparatus.

In this way, according to the radiation image data readout apparatus of the present invention, because the readout conditions have been set after an estimation of the quantity of radiation energy accumulated on each readout line is obtained, it is possible to reliably perform readout so that the quantity of detected light for each CCD element of the CCD sensor (C) is below the charge saturation quantity of the CCD element; for low-radiation zones, by making the number of times binning is performed large, the number of times readout is performed is reduced and noise can be reduced, and for high-radiation zones, the number of times binning is performed is made small, and saturation of the binning circuit can be prevented. As a result, a high-quality image can be obtained.

According to the current embodiment, also, although the sub-scanning is not stopped and the conducting of a preliminary reading and of the main reading is performed alternately for each readout line of the sheet 50, the sub-scanning can be stopped at each readout line, and after the preliminary reading and the main readout have been performed, the next readout line can be read out.

Also, a preliminary reading can be once conducted for the entire sheet 50, and based on the data obtained by said preliminary reading, the readout conditions for each readout line can be determined, and according to said readout conditions, the main readout of the sheet 50 can be performed.

In addition, according to the current embodiment, when setting the readout conditions, although the readout conditions are controlled based on the data obtained by the preliminary reading, the data of the readout line preceding the readout line that is to be readout can also be used.

That is to say, first, readout of the readout line A1 is performed a plurality of times each with a specified low quantity of detected light and the data Q1 obtained thereby of the readout line A1 is input to the controlling means 31, and the controlling means 31 sets the readout conditions of the readout line A2 based on said data Q1. The line sensor 20 reads out the readout line A2 based on the readout conditions set by the controlling means 31 (the control time and binning conditions), and obtains data Q2 of readout line A2. In the same way, the data Q3 of the readout line A3 is obtained based on the readout conditions set based on the data Q2.

The image data readout means 30 cumulatively stores the data Q1, Q2, etc., obtained in this way of readout each readout line A1, A2, etc., in memory zones provided corresponding to each position of the sheet 50 as corresponding image signals S, based on the speed of the conveyor belt 40. Afterwards, outputs these stored image signals S as image data to the image processing apparatus.

According to the current embodiment, for the readout line A1 is readout, for example, the data Q1(1), Q1(2), Q(3) obtained by reading out readout lines A1(1), A1(2), A1(3) are input to the image data readout means 30, and said image data readout means 30 adds the data Q1(1), Q1(2), Q(3) to obtain the data Q1 of the readout line A1; the data of each readout line can be obtained in this way, however, the sub-scanning can be stopped for each readout line, and readout can be performed a plurality of times for each readout line, and the data obtained at each of said plurality of times can be added to obtain the data for the readout line being read out.

Further, read out of the entire sheet 50 can be performed a plurality of times. That is to say, according to the readout conditions set by the controlling means 31 for each of the readout lines, each readout line of the sheet 50 is read out; this readout of the sheet 50 can be performed a plurality of times and the data obtained thereby can be added corresponding to each readout line of the sheet 50 to obtain the readout data for each readout line.

Still further, regarding the method to be used to estimate the quantity of radiation energy accumulated on a readout line, as described above, the quantity of radiation energy accumulated on a readout line is estimated by conducting a preliminary readout of the readout line that is to be read out, or based upon the data obtained by reading out the readout line preceding the readout line that is to be read out; however, both the method of conducting a preliminary reading and the method based on employing the data obtained by read out of the readout line preceding the readout line that is to be read out can be employed together in estimating the quantity of radiation energy accumulated on the readout line that is to be read out. For example, a preliminary reading is conducted for the first readout line, readout line A1, of the sheet 50 and data Q1' is obtained of readout line A1', and based on said data Q1', the readout conditions of the readout line A1 are set; the readout line A1 is readout and the data Q1 is obtained, however, for the readout line A2, a preliminary reading is not conducted, and based on the readout data Q1 already obtained of the readout line A1, the readout conditions of the readout line A2 are set, and the readout line A2 is readout according to said readout conditions. In the same way, for the readout of lines A3, A4, etc., the readout conditions therefor are set based on the data obtained by reading out the respective preceding readout line, and readout of each readout line is performed.

According to any of the embodiments described above, because the readout conditions are set after an estimation of the radiation energy accumulated on each readout line has been obtained, it becomes possible to reliably perform readout so that the quantity of detected light for each CCD element of the CCD sensor (C) is below the charge saturation quantity of the CCD element.

Note that the radiation image data readout apparatus according to the present invention is not limited to the embodiments described above, various types of publicly disclosed configurations of light sources, focusing optical light systems to be disposed between the light source and the sheet, optical systems to be disposed between the sheet and the line sensor, line sensors, and adding means can be adopted. Further, a configuration provided with an image processing unit for performing various types of signal processing on the image signal output from the radiation image data readout means, or a configuration provided with an erasing means for causing adequate dissipation of radiation energy remaining on a sheet after readout of the radiation image data contained thereon has been performed can also be adopted.

Figure 6:
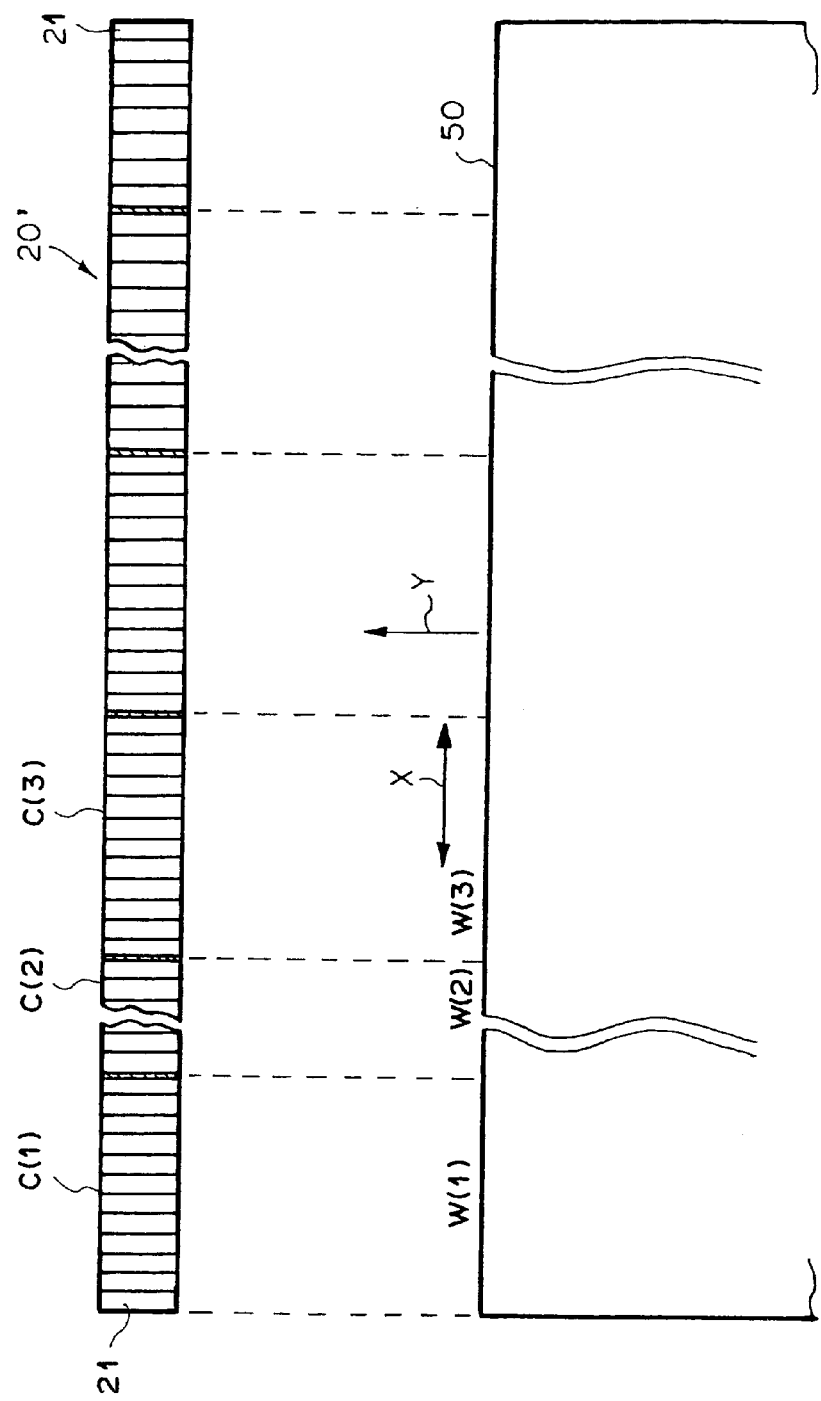
FIG. 6 is a detailed drawing of another example of the line sensor of the radiation image data readout apparatus shown in FIGS. 1 and 2.

In addition, according to the radiation image data readout apparatus of the embodiment described above, the line sensor 20 is formed of one CCD sensor, however, as shown in FIG. 6, even for cases in which the line sensor 20 is formed of a plurality of CCD sensors (C(1), C(2), C(3), etc.) arranged in a line in the sub-scanning direction, the embodiment described above can be implemented. Note that in this case, the charge accumulation time is determined for each CCD sensor so that, at the positions W(1), W(2), W(3), etc. corresponding to individual CCD elements, even for the portion of the readout line for which the estimated quantity of accumulated radiation energy is the highest, the quantity of detected light for each CCD element of each CCD sensor is smaller than the charge saturation quantity of that CCD element. If the binning conditions of each CCD sensor are determined based on the estimated quantity of radiation energy accumulated at each position W(1), W(2), W(3), etc., readout can be performed at an increased level of rationalization.

Figure 7:
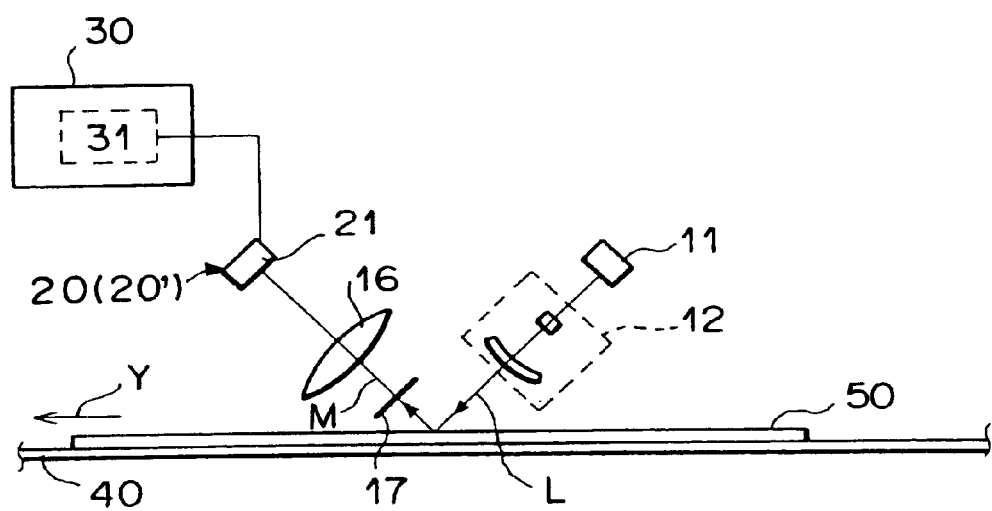
FIG. 7 is a schematic drawing of the configuration of a radiation image data readout apparatus according to another embodiment of the present invention.

Further, according to the radiation image data readout apparatus of the embodiment described above, a configuration has been adopted in which the stimulating-light L and the stimulated emission M partially share the same optical path in order to provide a more compact apparatus, however, the apparatus is not limited to being of such a configuration; for example, as shown in FIG. 7, a configuration in which there is no doubling whatsoever of the stimulating-light L optical path and the stimulated emission M optical path can be implemented.

That is to say, a radiation image readout apparatus 30 as shown in FIG. 7, in which the line sensor 20 shown in FIG. 3 or the line sensor 20' shown in FIG. 4 is used and which is provided with a scanning belt 40, comprises: a BLD 11 for emitting line-shaped stimulating-light L at a substantially 45° angle onto the surface of the sheet 50, an optical system 12 for projecting the line-shaped stimulating-light emitted from the BLD 11 onto the surface of the sheet 55 and which is formed of a combination of a collimator lens for focusing the line-shaped stimulating-light L emitted from the BLD 11 and a toric lens for spreading the beam in one direction only, a SELFOC lens array 16 for focusing onto each of the pixel regions 21 of the line sensor 20 the stimulated emission M emitted from the sheet 50 upon irradiation thereof by the stimulating-light L, and which is disposed at a 45° slant with respect to the sheet 50 and having a light axis that is substantially perpendicular to the direction in which the stimulating-light L proceeds, a stimulating-light cutoff filter 17 for cutting off the slight amount of stimulating-light L reflected from the surface of the sheet 50 and mixed with the stimulated emission M entering the SELFOC lens array 16, a line sensor 20 (or 20') for receiving and photoelectrically converting, according to the readout conditions described below, the stimulated emission M transmitted by the stimulating-light cutoff filter 17, and a controlling means 31 for determining the readout conditions of the line sensor 20 (or 20') for each readout line; wherein said image data readout means 30 computes an image signal by correlating the position of the sheet 50 and the data S obtained by reading out the radiation image stored on said sheet 50 according to the readout conditions set by the controlling means 31, and outputs the image signal.

The SELFOC lens 16 operates to focus of the stimulated emission M emitted by the sheet 50 at a 1:1 size ratio onto the light-receiving surface of the line sensor 20 (or 20'). Further, the optical system 12 formed of a collimator lens and a toric lens spreads the stimulating-light, that has been emitted from the BLD 11, onto a predetermined illumination range on the dichroic mirror 14.

Next, the operation of the radiation image data readout apparatus according to the current embodiment will be explained.

First, the sheet 50, which has been placed on the conveyor belt 40, storing radiation image data is conveyed in the direction indicated by the arrow Y by the movement of the conveyor belt in the direction indicated by the arrow Y. Here, the speed with which the sheet 50 is conveyed is equal to the speed with which the conveyor belt moves; the speed of the conveyor belt 40 is input to the image data readout means 30.

On the other hand, the BLD 11 emits the line-shaped stimulating-light L onto the surface of the sheet 50 at a substantially 45° slant in relation thereto, and this stimulating-light L is made into a parallel beam by the optical system 12 formed of a collimator lens and a toric lens and which has been disposed in the optical path of the stimulating-light L, and projects onto the surface of the sheet 50 at substantially 45° slant in relation thereto. Here, the stimulating-light L is emitted in a line-shape region extending in the direction indicated by the arrow X on the surface of the sheet 50.

Upon stimulation by the line-shaped stimulating-light L entering the sheet 50, stimulated emission M having an intensity corresponding to the radiation image data stored on the sheet 50 is emitted from the focusing zone of said sheet 50 and the surrounding environs thereof. This stimulated emission M is transmitted by the stimulating-light cutoff filter 17, which cuts off the small amount of the stimulating-light L reflected from the sheet 50 that has become mixed with the simulated emission M, after which, the stimulated emission M enters the SELFOC lens array 16, and is focused onto each of the pixel regions of the line sensor 20 or 20'.

The control of the readout conditions by the controlling means 31, and the operation of the line sensor 20 (or 20') after receiving the light of the stimulated emission is the same as that of the radiation image data readout apparatus according to the embodiments described above, and further explanation thereof has been omitted.

In this way, according to the radiation image data readout apparatus of the current embodiment, also, because the readout conditions have been set after an estimation of the quantity of radiation energy accumulated on each readout line is obtained, it is possible to reliably perform readout so that the quantity of detected light for each CCD element of the CCD sensor (C) is below the charge saturation quantity of the CCD element; for low-radiation zones, by making the number of times binning is performed large, the number of times readout is performed is reduced and noise can be reduced, and for high-radiation zones, the number of times binning is performed is made small, and saturation of the binning circuit can be prevented. As a result, a high-quality image can be obtained.

Figure 8:
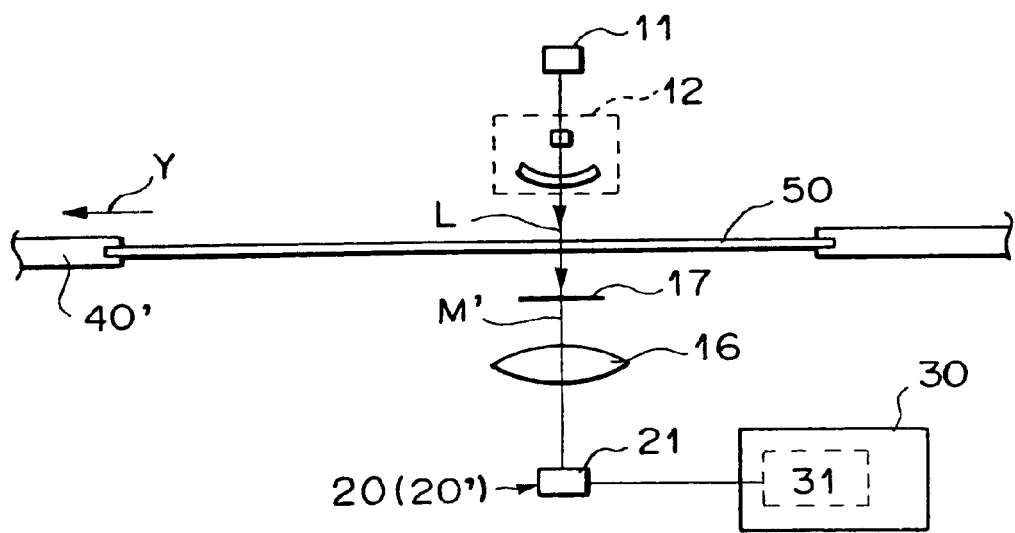
FIG. 8 is a schematic drawing of the configuration of a radiation image data readout apparatus according to another embodiment of the present invention.

According to each of the embodiments of a radiation image data readout apparatus described above, although a reflected-light collecting type configuration, in which the light source and the line sensor are both disposed on the same side of the sheet and the stimulated emission emitted from the sheet upon irradiation thereof by the stimulating light is received, has been adopted, the radiation image data readout apparatus according to the present invention is not limited to such a configuration; for example, by using a stimulable phosphor sheet having a substrate composed of a stimulated emission transmitting material, a transmitted-light collecting type configuration, as shown in FIG. 8, in which the light source and the line sensor can be disposed on mutually different sides of the sheet, and the stimulated emission received from the side opposite the side of the sheet from which the stimulating light has entered.

That is to say, the radiation image readout apparatus shown in FIG. 8 comprises an image data readout means 30 provided with a scanning belt 40' that supports the front end and the rear end of the sheet 50 (said front and rear ends of the sheet are not areas of interest, regardless of whether or not a radiation image is stored thereon or not) and which conveys the sheet 50 in the direction indicated by the arrow Y, a BLD 11 for emitting line-shaped stimulating-light L onto the surface of the sheet 50 in a direction substantially perpendicular thereto, an optical system 12 for projecting the line-shaped stimulating-light emitted from the BLD 11 onto the surface of the sheet 55 and which is formed of a combination of a collimator lens for focusing the line-shaped stimulating-light L emitted from the BLD 11 and a toric lens for spreading the beam in one direction only, a SELFOC lens array 16 for focusing on to the line sensor 20 (or 20') the stimulated emission M' emitted from the back side of the sheet 50 (the side of the sheet opposite the side from which the stimulating light has entered the sheet) upon irradiation thereof by the stimulating-light L and which has a light axis that is substantially perpendicular to the back side of the sheet 50, a stimulating-light cutoff filter 17 for cutting off the slight amount of stimulating-light L mixed with the stimulated emission M' entering the SELFOC lens array 16, a line sensor 20 (or 20') for receiving and photo-electrically converting, according to the readout conditions described below, the stimulated emission M' transmitted by the stimulating-light cutoff filter 17, and a controlling means 31 for determining the readout conditions of the line sensor 20 (or 20') for each readout line; wherein said image data readout means 30 computes an image signal by correlating the position of the sheet 50 and the data S obtained by reading out the radiation image stored on said sheet 50 according to the readout conditions set by the controlling means 31, and outputs the image signal.

The SELFOC lens 16 operates to focus of the stimulated emission M' emitted by the sheet 50 at a 1:1 size ratio onto the light-receiving surface of the line sensor 20 (or 20'). Further, the optical system 12 formed of a collimator lens and a toric lens spreads the stimulating-light, that has been emitted from the BLD 11, onto a predetermined illumination range on the dichroic mirror 14.

Next, the operation of the radiation image data readout apparatus according to the current embodiment will be explained.

First, the sheet 50, which has been placed on the conveyor belt 40', storing radiation image data is conveyed in the direction indicated by the arrow Y by the movement of the conveyor belt in the direction indicated by the arrow Y. Here, the speed with which the sheet 50 is conveyed is equal to the speed with which the conveyor belt moves; the speed of the conveyor belt 40' is input to the image data readout means 30.

On the other hand, the BLD 11 emits the line-shaped stimulating-light L onto the surface of the sheet 50 in a direction substantially perpendicular thereto, and this stimulating-light L is made into a parallel beam by the optical system 12 formed of a collimator lens and a toric lens and which has been disposed in the optical path of the stimulating-light L, and projects onto the surface of the sheet 50 at a direction substantially perpendicular thereto. Here, the stimulating-light L is emitted in a line-shape region extending in the direction indicated by the arrow X on the surface of the sheet 50.

Upon stimulation by the line-shaped stimulating-light L entering the sheet 50, stimulated emission M' having an intensity corresponding to the radiation image data stored on the sheet 50 is emitted from the focusing zone of said sheet 50 and the surrounding environs thereof. Further, at the same time, the stimulated emission M' is transmitted by the stimulated emission transmitting substrate of the sheet 50 and is emitted from the back side of the sheet 50 as well.

The stimulated emission M' emitted from a portion of the back side of the sheet 50 is transmitted by the stimulating-light cutoff filter 17, which cuts off the small quantity of stimulating-light L mixed with the stimulated emission M', after which it enters the SELFOC lens 16 and is focused onto each of the pixel regions of the line sensor 20 (or 20').

The control of the readout conditions by the controlling means 31, and the operation of the line sensor 20 (or 20') after receiving the light of the stimulated emission is the same as that of the radiation image data readout apparatus according to the embodiments described above, and further explanation thereof has been omitted.

In this way, according to the radiation image data readout apparatus of the current embodiment, also, because the readout conditions have been set after an estimation of the quantity of radiation energy accumulated on each readout line is obtained, it is possible to reliably perform readout so that the quantity of detected light for each CCD element of the CCD sensor (C) is below the charge saturation quantity of the CCD element; for low-radiation zones, by making the number of times binning is performed large, the number of times readout is performed is reduced and noise can be reduced, and for high-radiation zones, the number of times binning is performed is made small, and saturation of the binning circuit can be prevented. As a result, a high-quality image can be obtained.

In addition, according to each of the radiation image data readout apparatuses of the embodiments described above, the sheet used can be a normal stimulable phosphor sheet containing stimulable phosphors combining both the radiation absorption function and the radiation energy, that is, radiation energy accumulation function, however, as described above, if a stimulable phosphor sheet containing a dedicated accumulation-use stimulable phosphor is used, the quality of the image can be raised a level.

Further, according to each of the radiation image data readout apparatuses of the embodiments described above, the sheet used can be a radiation energy subtraction-use stimulable phosphor sheet for cumulatively storing two types of image data, which have mutually different radiation energy absorption characteristics, for the same subject of which an image is to be obtained, wherein a separate stimulated emission is emitted from the front face and the rear face corresponding to said each of said two types of image data; the image readout apparatus can be of a configuration provided with a separate line sensor on each of both faces of the sheet, and a readout means for correlating the pixels of the front face and the back face of the sheet and performing subtraction processing on the data read out from both faces. In this case, also, for each of both the line sensor disposed on the rear-face side of the sheet and the line sensor disposed on the front-face side of the sheet, as described above, the readout conditions are set after an estimation of the quantity of radiation energy accumulated on each readout line is obtained, and it is possible to reliably perform readout so that the quantity of detected light f or each CCD element of the CCD sensor (C) is below the charge saturation quantity of the CCD element: for low-radiation zones, by making the number of times binning is performed large, the number of times readout is performed is reduced and noise can be reduced, and for high-radiation zones, the number of times binning is performed is made small, and saturation of the binning circuit can be prevented.

Still further, even so-called differentiated sheets can be used as the radiation energy subtraction-use stimulable phosphor sheet; for example, a sheet finely divided into a plurality of microscopic cells by walls formed of a stimulating-light reflecting material extending in the direction of the thickness of the sheet.

What is claimed is:

1. A radiation image data readout method comprising
irradiating with a stimulating-light emitted in a line-shape a portion of the surface of a stimulable phosphor sheet storing radiation image data, receiving and photoelectrically converting, by use of a line sensor formed of one or more CCD sensors each divided into a plurality of pixel regions along the lengthwise direction of the portion of the stimulable phosphor sheet that has been irradiated by the stimulating-light emitted in a line-shape, the stimulated emission emitted from the portion of the stimulable phosphor sheet that has been irradiated by the stimulating-light emitted in a line-shape or the portion of the rear face of the stimulable phosphor sheet corresponding to the portion of the stimulable phosphor sheet that has been irradiated by the stimulating-light emitted in a line-shape, moving the line-light source emitting the stimulating-light and the line sensor relatively, in a direction different from that of aforementioned lengthwise direction, from one end of the stimulable phosphor sheet to the other and sequentially reading out the output of the line sensor corresponding to each readout line according to aforementioned movement, and obtaining the output of each of the pixel regions at each of the positions of the readout lines, wherein when readout is performed, the radiation energy stored on the readout line of each position is estimated, and based on said estimated quantity of radiation energy, the readout settings, which are formed of the line sensor charge accumulation time and the binning conditions, are set, and the readout lines are readout according to said readout conditions.

2. A radiation image data readout method as defined in claim 1, wherein the stimulable phosphor sheet contains stimulable phosphor, and wherein the stimulable phosphor is capable of absorbing light within the wavelength range of UV to visible to accumulate energy thereof, being stimulated by light within the wavelength range of visible to infrared, and emitting as stimulated emission the energy accumulated thereon.

3. A radiation image data readout method as defined in claim 1 or 2, wherein the quantity of radiation energy accumulated on a readout line that is to be readout is estimated based on the data obtained by reading out the readout line preceding the readout line to be read out, and based on said estimated quantity of radiation energy, the readout conditions for the readout line that is to be read out are determined.

4. A radiation image data readout method as defined in claim 3, wherein based on the estimated quantity of radiation energy accumulated on the readout line that is to be read out, the line sensor charge accumulation time for the readout line that is to be read out is determined so that the detected quantity of light is below the charge saturation quantity of the CCD element, even for the portion of said readout line on which the most radiation energy has been accumulated.

5. A radiation image data readout method as defined in claim 4, wherein based on the estimated quantity of radiation energy accumulated on the readout line that is to be read out, the line sensor binning conditions are set so that the number of times binning is performed is smaller for the portion of said readout line on which more radiation energy has been accumulated, and the number of times binning is performed is larger for the portion of said readout line on which less radiation energy has been accumulated.

6. A radiation image data readout method as defined in claim 3, wherein for cases in which the line sensor is formed of a plurality of CCD sensors arranged in a line, the charge accumulation time of the line sensor includes the charge accumulation time of each of the CCD sensors, and based on the estimated quantity of radiation energy accumulated on the readout line that is to be read out, the charge accumulation time of each of the CCD sensors is determined so that the quantity of detected light at each of the positions corresponding to each of CCD elements of the CCD sensors is below the charge saturation quantity of the respective CCD element, even for the portion of said readout line on which the most radiation energy has been accumulated.

7. A radiation image data readout method as defined in claim 6, wherein based on the estimated quantity of radiation energy accumulated on the readout line that is to be read out, the line sensor binning conditions are set so that the number of times binning is performed is smaller for the portion of said readout line on which more radiation energy has been accumulated, and the number of times binning is performed is larger for the portion of said readout line on which less radiation energy has been accumulated.

8. A radiation image data readout method as defined in claim 3, wherein based on the estimated quantity of radiation energy accumulated on the readout line that is to be read out, the line sensor binning conditions are set so that the number of times binning is performed is smaller for the portion of said readout line on which more radiation energy has been accumulated, and the number of times binning is performed is larger for the portion of said readout line on which less radiation energy has been accumulated.

9. A radiation image data readout method as defined in claim 1 or 2, wherein the quantity of radiation energy accumulated on a readout line that is to be read out is estimated based on the data obtained by conducting preliminary reading for said readout line, and based on said estimated quantity of radiation energy, the readout conditions for the readout line that is to be read out are determined.

10. A radiation image data readout method as defined in claim 9, wherein based on the estimated quantity of radiation energy accumulated on the readout line that is to be read out, the line sensor charge accumulation time for the readout line that is to be read out is determined so that the detected quantity of light for each of CCD elements of the CCD sensors is below the charge saturation quantity of the CCD element, even for the portion of said readout line on which the most radiation energy has been accumulated.

11. A radiation image data readout method as defined in claim 10, wherein based on the estimated quantity of radiation energy accumulated on the readout line that is to be read out, the line sensor binning conditions are set so that the number of times binning is performed is smaller for the portion of said readout line on which more radiation energy has been accumulated, and the number of times binning is performed is larger for the portion of said readout line on which less radiation energy has been accumulated.

12. A radiation image data readout method as defined in claim 9, wherein for cases in which the line sensor is formed of a plurality of CCD sensors arranged in a line, the charge accumulation time of the line sensor includes the charge accumulation time of each of the CCD sensors, and based on the estimated quantity of radiation energy accumulated on the readout line that is to be read out, the charge accumulation time of each of the CCD sensors is determined so that the quantity of detected light at each of the positions corresponding to each of CCD elements of each CCD sensor is below the charge saturation quantity of the respective CCD element, even for the portion of said readout line on which the most radiation energy has been accumulated.

13. A radiation image data readout method as defined in claim 12, wherein based on the estimated quantity of radiation energy accumulated on the readout line that is to be read out, the line sensor binning conditions are set so that the number of times binning is performed is smaller for the portion of said readout line on which more radiation energy has been accumulated, and the number of times binning is performed is larger for the portion of said readout line on which less radiation energy has been accumulated.

14. A radiation image data readout method as defined in claim 9, wherein
based on the estimated quantity of radiation energy accumulated on the readout line that is to be read out, the line sensor binning conditions are set so that the number of times binning is performed is smaller for the portion of said readout line on which more radiation energy has been accumulated, and the number of times binning is performed is larger for the portion of said readout line on which less radiation energy has been accumulated.

15. A radiation image data readout method as defined in claim 1 or 2, wherein
based on the estimated quantity of radiation energy accumulated on the readout line that is to be read out, the line sensor charge accumulation time for the readout line that is to be read out is determined so that the detected quantity of light for each of CCD elements of the CCD sensors is below the charge saturation quantity of the CCD element, even for the portion of said readout line on which the most radiation energy has been accumulated.

16. A radiation image data readout method as defined in claim 15, wherein
based on the estimated quantity of radiation energy accumulated on the readout line that is to be read out, the line sensor binning conditions are set so that the number of times binning is performed is smaller for the portion of said readout line on which more radiation energy has been accumulated, and the number of times binning is performed is larger for the portion of said readout line on which less radiation energy has been accumulated.

17. A radiation image data readout method as defined in claim 1 or 2, wherein
for cases in which the line sensor is formed of a plurality of CCD sensors arranged in a line, the charge accumulation time of the line sensor includes the charge accumulation time of each of the CCD sensors, and based on the estimated quantity of radiation energy accumulated on the readout line that is to be read out, the charge accumulation time of each of the CCD sensors is determined so that the quantity of detected light at each of the positions corresponding to each of CCD elements of the CCD sensors is below the charge saturation quantity of the respective CCD element, even for the portion of said readout line on which the most radiation energy has been accumulated.

18. A radiation image data readout method as defined in claim 17, wherein
based on the estimated quantity of radiation energy accumulated on the readout line that is to be read out, the line sensor binning conditions are set so that the number of times binning is performed is smaller for the portion of said readout line on which more radiation energy has been accumulated, and the number of times binning is performed is larger for the portion of said readout line on which less radiation energy has been accumulated.

19. A radiation image data readout method as defined in claim 1 or 2, wherein
based on the estimated quantity of radiation energy accumulated on the readout line that is to be read out, the line sensor binning conditions are set so that the number of times binning is performed is smaller for the portion of said readout line on which more radiation energy has been accumulated, and the number of times binning is performed is larger for the portion of said readout line on which less radiation energy has been accumulated.

20. A radiation image data readout apparatus comprising
a line-light source for irradiating with a stimulating-light emitted in a line-shape a portion of the surface of a stimulable phosphor sheet storing radiation image data,
a line sensor formed of one or more CCD sensors each for receiving and photoelectrically converting the stimulated emission emitted from the portion of the stimulable phosphor sheet that has been irradiated by the stimulating-light emitted in a line-shape or the portion of the rear face of the stimulable phosphor sheet corresponding to the portion of the stimulable phosphor sheet that has been irradiated by the stimulating-light emitted in a line-shape,
a scanning means for moving the line-light source emitting the stimulating-light and the line sensor relatively, in a direction different from that of aforementioned lengthwise direction, from one end of the stimulable phosphor sheet to the other, and
a readout means for sequentially reading out the output of the line sensor at each of the positions of the readout lines according to aforementioned movement, and obtaining the output of each of the pixel regions occurring at each of the positions along the lengthwise direction of each CCD sensor, wherein
said readout means further comprises a readout conditions controlling means for estimating the radiation energy accumulated on the readout line of each position, and determining, based on said estimated quantity of radiation energy, the line sensor charge accumulation time and the binning conditions.

21. A radiation image data readout apparatus as defined in claim 20, wherein
the stimulable phosphor sheet contains stimulable phosphor, and wherein
the stimulable phosphor is capable of absorbing light within the wavelength range of UV to visible to accumulate energy thereof, being stimulated by light within the wavelength range of visible to infrared, and emitting as stimulated emission the energy accumulated thereon.

22. A radiation image data readout apparatus as defined in claim 20 or 21, wherein
said readout conditions controlling means estimates, based on the data obtained by reading out the readout line preceding the readout line that is to be readout, the quantity of radiation energy accumulated on said readout line that is to be readout, and based on said estimated quantity of radiation energy, determines the readout conditions for said readout line that is to be read out.

23. A radiation image data readout apparatus as defined in claim 22, wherein
said readout conditions controlling means determines, based on the estimated quantity of radiation energy accumulated on the readout line that is to be read out, the line sensor charge accumulation time for the readout line that is to be read out so that the detected quantity of light for each of CCD elements of the CCD sensors is below the charge saturation quantity of the CCD element, even for the portion of said readout line on which the most radiation energy has been accumulated.

24. A radiation image data readout apparatus as defined in claim 23, wherein said readout conditions controlling means determines, based on the estimated quantity of radiation energy accumulated on the readout line that is to be read out, the line sensor binning conditions so that the number of times binning is performed is smaller for the portion of said readout line on which more radiation energy has been accumulated, and the number of times binning is performed is larger for the portion of said readout line on which less radiation energy has been accumulated.

25. A radiation image data readout apparatus as defined in claim 23, wherein for cases in which the line sensor is formed of a plurality of CCD sensors arranged in a line, said readout conditions controlling means determines the binning conditions separately for each of the CCD sensors constituting the line sensor.

26. A radiation image data readout apparatus as defined in claim 22, wherein for cases in which the line sensor is formed of a plurality of CCD sensors arranged in a line, said readout conditions controlling means determines, based on the estimated quantity of radiation energy accumulated on the readout line that is to be read out, the charge accumulation time of each of the CCD sensors so that the quantity of detected light at each of the positions corresponding to each of CCD elements of the CCD sensors is below the charge saturation quantity of the respective CCD element, even for the portion of said readout line on which the most radiation energy has been accumulated.

27. A radiation image data readout apparatus as defined in claim 26, wherein said readout conditions controlling means determines, based on the estimated quantity of radiation energy accumulated on the readout line that is to be read out, the line sensor binning conditions so that the number of times binning is performed is smaller for the portion of said readout line on which more radiation energy has been accumulated, and the number of times binning is performed is larger for the portion of said readout line on which less radiation energy has been accumulated.

28. A radiation image data readout apparatus as defined in claim 26, wherein for cases in which the line sensor is formed of a plurality of CCD sensors arranged in a line, said readout conditions controlling means determines the binning conditions separately for each of the CCD sensors constituting the line sensor.

29. A radiation image data readout apparatus as defined in claim 22, wherein said readout conditions controlling means determines, based on the estimated quantity of radiation energy accumulated on the readout line that is to be read out, the line sensor binning conditions so that the number of times binning is performed is smaller for the portion of said readout line on which more radiation energy has been accumulated, and the number of times binning is performed is larger for the portion of said readout line on which less radiation energy has been accumulated.

30. A radiation image data readout apparatus as defined in claim 22, wherein for cases in which the line sensor is formed of a plurality of CCD sensors arranged in a line, said readout conditions controlling means determines the binning conditions separately for each of the CCD sensors constituting the line sensor.

31. A radiation image data readout apparatus as defined in claim 20 or 21, wherein said readout conditions controlling means estimates, based on the data obtained by conducting a preliminary reading for the readout line, the quantity of radiation energy accumulated on a readout line that is to be read out, and based on said estimated quantity of radiation energy, determines the readout conditions for the readout line that is to be read out.

32. A radiation image data readout apparatus as defined in claim 3, wherein said readout conditions controlling means determines, based on the estimated quantity of radiation energy accumulated on the readout line that is to be read out, the line sensor charge accumulation time for the readout line that is to be read out so that the detected quantity of light for each of CCD elements of the CCD sensors is below the charge saturation quantity of the CCD element, even for the portion of said readout line on which the most radiation energy has been accumulated.

33. A radiation image data readout apparatus as defined in claim 32, wherein said readout conditions controlling means determines, based on the estimated quantity of radiation energy accumulated on the readout line that is to be read out, the line sensor binning conditions so that the number of times binning is performed is smaller for the portion of said readout line on which more radiation energy has been accumulated, and the number of times binning is performed is larger for the portion of said readout line on which less radiation energy has been accumulated.

34. A radiation image data readout apparatus as defined in claim 32, wherein for cases in which the line sensor is formed of a plurality of CCD sensors arranged in a line, said readout conditions controlling means determines the binning conditions separately for each of the CCD sensors constituting the line sensor.

35. A radiation image data readout apparatus as defined in claim 31, wherein for cases in which the line sensor is formed of a plurality of CCD sensors arranged in a line, said readout conditions controlling means determines, based on the estimated quantity of radiation energy accumulated on the readout line that is to be read out, the charge accumulation time of each of the CCD sensors so that the quantity of detected light at each of the positions corresponding to each of CCD elements of the CCD sensors is below the charge saturation quantity of the respective CCD element, even for the portion of said readout line on which the most radiation energy has been accumulated.

36. A radiation image data readout apparatus as defined in claim 35, wherein said readout conditions controlling means determines, based on the estimated quantity of radiation energy accumulated on the readout line that is to be read out, the line sensor binning conditions so that the number of times binning is performed is smaller for the portion of said readout line on which more radiation energy has been accumulated, and the number of times binning is performed is larger for the portion of said readout line on which less radiation energy has been accumulated.

37. A radiation image data readout apparatus as defined in claim 35, wherein for cases in which the line sensor is formed of a plurality of CCD sensors arranged in a line, said readout conditions controlling means determines the binning conditions separately for each of the CCD sensors constituting the line sensor.

38. A radiation image data readout apparatus as defined in claim 31, wherein said readout conditions controlling means determines, based on the estimated quantity of radiation energy accumulated on the readout line that is to be read out, the line sensor binning conditions so that the number of times binning is performed is smaller for the portion of said readout line on which more radiation energy has been accumulated, and the number of times binning is performed is larger for the portion of said readout line on which less radiation energy has been accumulated.

39. A radiation image data readout apparatus as defined in claim 31, wherein for cases in which the line sensor is formed of a plurality of CCD sensors arranged in a line, said readout conditions controlling means determines the binning conditions separately for each of the CCD sensors constituting the line sensor.

40. A radiation image data readout apparatus as defined in claim 20 or 21, wherein said readout conditions controlling means determines, based on the estimated quantity of radiation energy accumulated on the readout line that is to be read out, the line sensor charge accumulation time for the readout line that is to be read out so that the detected quantity of light for each CCD element of the CCD sensors is below the charge saturation quantity of the CCD element, even for the portion of said readout line on which the most radiation energy has been accumulated.

41. A radiation image data readout apparatus as defined in claim 40, wherein said readout conditions controlling means determines, based on the estimated quantity of radiation energy accumulated on the readout line that is to be read out, the line sensor binning conditions so that the number of times binning is performed is smaller for the portion of said readout line on which more radiation energy has been accumulated, and the number of times binning is performed is larger for the portion of said readout line on which less radiation energy has been accumulated.

42. A radiation image data readout apparatus as defined in claim 40, wherein for cases in which the line sensor is formed of a plurality of CCD sensors arranged in a line, said readout conditions controlling means determines the binning conditions separately for each of the CCD sensors constituting the line sensor.

43. A radiation image data readout apparatus as defined in claim 20 or 21, wherein for cases in which the line sensor is formed of a plurality of CCD sensors arranged in a line, said readout conditions controlling means determines, based on the estimated quantity of radiation energy accumulated on the readout line that is to be read out, the charge accumulation time of each of the CCD sensors so that the quantity of detected light at each of the positions corresponding to each of CCD elements of the CCD sensors is below the charge saturation quantity of the respective CCD element, even for the portion of said readout line on which the most radiation energy has been accumulated.

44. A radiation image data readout apparatus as defined in claim 43, wherein said readout conditions controlling means determines, based on the estimated quantity of radiation energy accumulated on the readout line that is to be read out, the line sensor binning conditions so that the number of times binning is performed is smaller for the portion of said readout line on which more radiation energy has been accumulated, and the number of times binning is performed is larger for the portion of said readout line on which less radiation energy has been accumulated.

45. A radiation image data readout apparatus as defined in claim 43, wherein for cases in which the line sensor is formed of a plurality of CCD sensors arranged in a line, said readout conditions controlling means determines the binning conditions separately for each of the CCD sensors constituting the line sensor.

46. A radiation image data readout apparatus as defined in claim 20 or 21, wherein said readout conditions controlling means determines, based on the estimated quantity of radiation energy accumulated on the readout line that is to be read out, the line sensor binning conditions so that the number of times binning is performed is smaller for the portion of said readout line on which more radiation energy has been accumulated, and the number of times binning is performed is larger for the portion of said readout line on which less radiation energy has been accumulated.

47. A radiation image data readout apparatus as defined in claim 20 or 21, wherein for cases in which the line sensor is formed of a plurality of CCD sensors arranged in a line, said readout conditions controlling means determines the binning conditions separately for each of the CCD sensors constituting the line sensor.

* * * * *